US008185846B2

(12) United States Patent
Kuwahara et al.

(10) Patent No.: US 8,185,846 B2
(45) Date of Patent: May 22, 2012

(54) TEACHING BOX FOR USE IN ROBOT, CUSTOMIZATION METHOD, AND ROBOT SYSTEM USING THE SAME

(75) Inventors: Kouichi Kuwahara, Kitakyushu (JP); Yumie Kubota, Kitakyushu (JP); Tomohiro Matsuo, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 580 days.

(21) Appl. No.: 11/908,997

(22) PCT Filed: Mar. 10, 2006

(86) PCT No.: PCT/JP2006/304732
§ 371 (c)(1),
(2), (4) Date: Sep. 18, 2007

(87) PCT Pub. No.: WO2006/100940
PCT Pub. Date: Sep. 28, 2006

(65) Prior Publication Data
US 2009/0241047 A1 Sep. 24, 2009

(30) Foreign Application Priority Data

Mar. 18, 2005 (JP) ................................. 2005-078828
Oct. 17, 2005 (JP) ................................. 2005-302135

(51) Int. Cl.
*G06F 3/00* (2006.01)
(52) U.S. Cl. ...................................................... 715/866
(58) Field of Classification Search .................. 715/788, 715/800, 815, 736, 771, 866
See application file for complete search history.

(56) References Cited

U.S. PATENT DOCUMENTS

| 6,452,597 | B1 * | 9/2002 | Goldberg et al. ............. 345/472 |
| 2004/0133853 | A1 * | 7/2004 | Poerner et al. ................ 715/514 |
| 2006/0107231 | A1 * | 5/2006 | Matthews et al. ............. 715/788 |

FOREIGN PATENT DOCUMENTS

| JP | 4-70955 | A | 3/1992 |
| JP | 6-115207 | A | 4/1994 |
| JP | 7-152737 | A | 6/1995 |
| JP | 2716684 | B2 | 11/1997 |
| JP | 2002-154085 | A | 5/2002 |

OTHER PUBLICATIONS

Japanese Office Action issued on May 30, 2011 in the corresponding Japanese Patent Application No. 2007-509197.

* cited by examiner

*Primary Examiner* — Thanh Vu
(74) *Attorney, Agent, or Firm* — Sughrue Mion, PLLC

(57) ABSTRACT

The present invention provides a teaching box configured such that an operator can optionally change a coloration and a size of a text displayed on a display area. The teaching box includes a main menu area, a pulldown menu area, a status area, a general-purpose area, and a message area, for monitoring and controlling an operation of an industrial robot which is operated in a plurality of modes including a teaching mode and an operation setting mode. The main menu area includes a customization portion operable to change a size and a coloration of a text, and a display portion operable to display the text set by the customization portion.

5 Claims, 11 Drawing Sheets

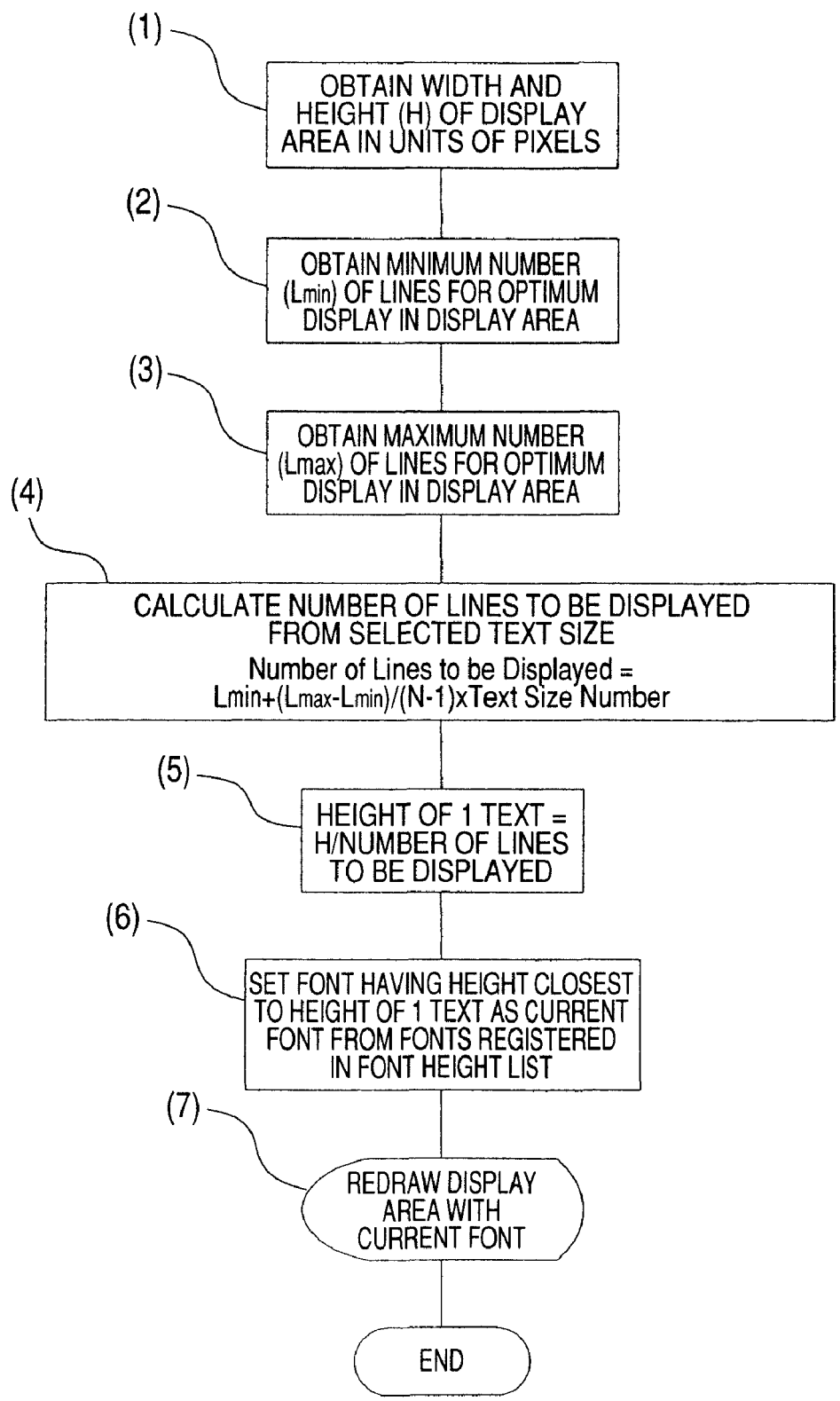

FIG. 8A

| ABCD | W |
|------|-----|
| EFG | XYZ |
| HIJ | 0123 |
| KL | 45 |
| MNOP | 67 |
| QRS | |
| TUV | |

FIG. 8B

| ABCD | QRS | 45 |
|------|-----|-----|
| EFG | TUV | 67 |
| HIJ | W | |
| KL | XYZ | |
| MNOP | 0123 | |

FIG. 9
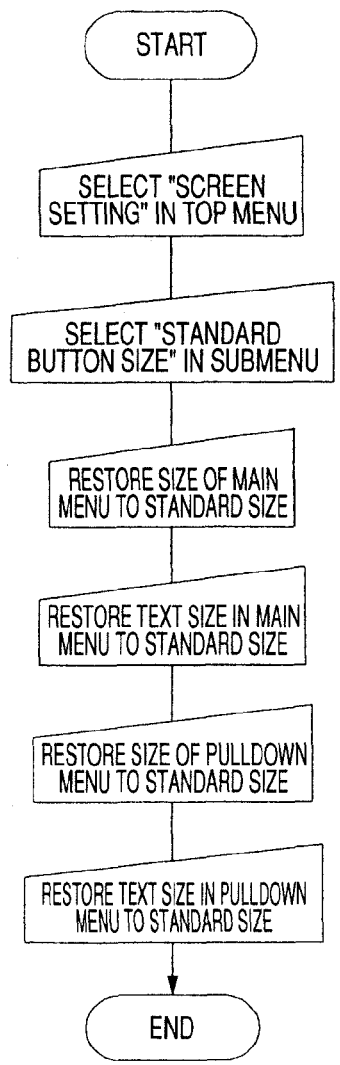
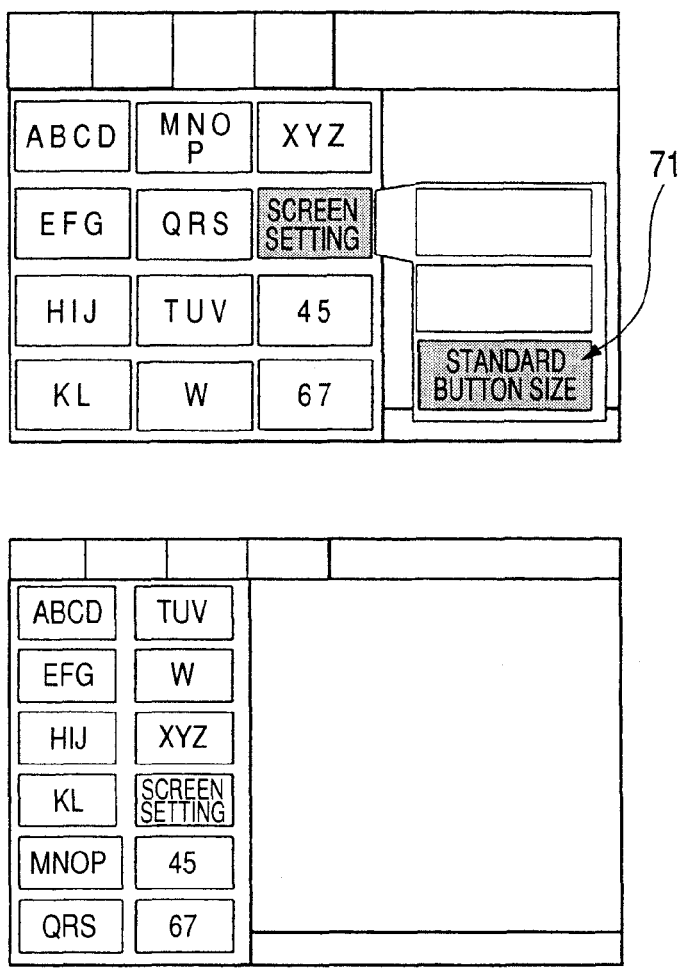

TEACHING BOX FOR USE IN ROBOT, CUSTOMIZATION METHOD, AND ROBOT SYSTEM USING THE SAME

TECHNICAL FIELD

The present invention relates to a teaching box of a teaching device for an industrial robot, a customization method, and an industrial robot system.

BACKGROUND ART

A conventional teaching box, including a multifunctional panel and used for a robot, has a color liquid crystal display device, and can highlight or transparentize a color corresponding to a necessary mode key (see, e.g., Patent Document 1). FIG. 13 illustrates a schematic electric configuration. A central processing unit 30 (hereinafter, abbreviated as a "CPU"), a read-only memory 31 (hereinafter, abbreviated as a "ROM"), and a read/write memory 32 (hereinafter, abbreviated as a "RAM") are operated in accordance with programs that are preliminarily set in the ROM 31, and constitute control means. A touch panel interface 33 (hereinafter, abbreviated as a "touch panel I/F"), and a graphic controller 34 are connected to the CPU 30. The graphic controller 34 temporarily stores images to be displayed in the RAM 35, and controls a state of a image display on a color liquid crystal display device 38 provided on a rear side of a touch panel 37 of a multifunctional panel 36. The touch panel 37 includes transparent switches arranged in a matrix over a display screen of the color liquid crystal display device 38. Data on an input position, at which the data is input by touching a fingertip on the touch panel 37, is input to the CPU 30 via the touch panel I/F 33. The CPU 30 transmits operation data in accordance with an input instruction to a robot control board via a communication interface 19 (hereinafter, abbreviated as a "communication I/F").

With such a configuration, a color of a color indication corresponding to an invalid key on the touch panel 37 is lightened. When it is determined that a key for a mode to be used is pressed, a predetermined color is highlighted. A user can optionally change a coloration of icons.

Patent Document 1: Japanese Patent No. 2716684 (page 3 FIG. 1)

DISCLOSURE OF THE INVENTION

Problems that the Invention is to Solve

However, although the conventional teaching box has the function of highlighting or transparentizing coloration of an operation mode, it does not have a function of customizing a text displayed in a teaching area. Accordingly, there is a problem that a color and a size of a text to be displayed cannot be changed. Thus, operability that is sufficient for various uses cannot be obtained.

Also, because the conventional teaching box does not have the function of customizing a text displayed in the display area so that a color and a size of the displaying text cannot be changed, there is a problem that it cannot meet different operator-dependent demands such as increasing a size of a displaying text to facilitate an operation, or displaying more information despite of a small size of the displaying text.

Also, because the conventional teaching box does not have the function of changing the size of an operation button displayed in the display area of a screen, there is a problem that it cannot meet different operator-dependent demands such as increasing the size of an operation button to facilitate an operation or enlarging a data display area to display more data despite of the small size of the operation button.

Such problems are prominent, particularly in a case where a teaching device is equipped with a touch panel, and where an operation is performed by touching a screen thereof.

The invention is accomplished in view of such problems, and it is an object thereof to provide a teaching box configured such that an operator can optionally change a coloration and a size of a text and an operation button which are displayed in a display area.

Means for Solving the Problems

To solve the above-described problem, the invention is constituted as follows.

According to a first aspect of the invention, a teaching box includes a main menu area, a pulldown menu area, a status area, a general-purpose area, and a message area, for monitoring and controlling an operation of an industrial robot which is operated in a plurality of modes including a teaching mode and an operation setting mode. The main menu area includes a customization portion operable to change a size and a coloration of a text; and a display portion operable to display the text set by the customization portion.

According to a second aspect of the invention, a teaching box includes a main menu area, a pulldown menu area, a status area, a general-purpose area, and a message area, for monitoring and controlling an operation of an industrial robot which is operated in a plurality of modes including a teaching mode and an operation setting mode. A customization portion, for changing a size and a coloration of a text in the main menu, changes the size of text based on a text number corresponding to the size of the text.

According to a third aspect of the invention, a display portion, for displaying the text set by the customization portion, obtains a number of lines to be displayed and a height of the size of the text from a size of a display area and the size of the text.

According to a fourth aspect of the invention, a teaching box includes a main menu area, a pulldown menu area, a status area, a general-purpose area, and a message area, for monitoring and controlling an operation of an industrial robot which is operated in a plurality of modes including a teaching mode and an operation setting mode. The teaching box includes a customization portion operable to change a size of an operation button in the main menu area, and a display portion operable to display the operation button set by the customization portion.

According to a fifth aspect of the invention, the customization portion for changing the size of the operation button in the main menu area is operated from a screen for customizing the size of the operation button.

According to a sixth aspect of the invention, the customization portion for changing the size of the operation button in the main menu area is operated from an operation key of the teaching box.

According to a seventh aspect of the invention, the customization portion for changing the size of the operation button in the main menu area is operated from a touch panel on a screen.

According to an eighth aspect of the invention, a display portion for displaying the operation button set by the customization portion obtains a number of operation buttons to be displayed in one column and a height of a size of a text from a size of a display area and the size of the operation button.

According to a ninth aspect of the invention, a teaching box includes a main menu area, a pulldown menu area, a status area, a general-purpose area, and a message area, for monitoring and controlling an operation of an industrial robot which is operated in a plurality of modes including a teaching mode and an operation setting mode. The teaching box includes an operation portion operable to restore a size of a text, a coloration, and a size of a button in all of the areas, which are customized from the main menu area, to standard sizes and a coloration at once, and a display portion operable to display a text and an operation button that are set to the standard sizes and the coloration by the operation portion.

According to a tenth aspect of the invention, the teaching box is operable to communicate with a robot controller, and is operable to set working conditions of a robot of and to monitor an operating state.

According to an eleventh aspect of the invention, the teaching box is operable to communicate with a robot controller, and is operable to set working conditions of the robot and to monitor an operating state.

Effects of the Invention

According to the first aspect of the invention, the size and the coloration of the text can be customized. Thus, the operability of an operator is improved so that the working efficiency enhanced. Further, the size and the coloration of the text can be adapted to meet a demand of an operator. Thus, erroneous operations by the operator are reduced so that safe operations of a robot can be achieved.

According to the second aspect of the invention, the size and the coloration of the text can be selected from a menu. Thus, a workload of an operator is reduced, and a display screen suitable for an operating condition of a robot can easily be created.

According to the third aspect of the invention, the changed text size and the changed coloration can automatically be generated without detailed designations by an operator. Thus, operations to be performed by the operator can be simplified so that the operability for the operator is improved. Consequently, working efficiency can be enhanced.

According to the fourth to seventh aspects of the invention, the size of each operation button can be customized. Thus, the size of the operation button can be adapted to meet a demand of an operator. Accordingly, erroneous operations by the operator are reduced, and safe operations of a robot can be achieved.

According to the eighth aspect of the invention, the changed operation button can automatically be generated without detailed designations by an operator. Thus, operations to be performed by the operator can be simplified so that the operability for the operator can be enhanced. Consequently, working efficiency can be enhanced.

According to the ninth aspect of the invention, the text sizes, the colorations, and the operation button sizes in all areas can automatically be restored to the standard sizes and the standard coloration at a time without detailed designations by an operator. Thus, operations to be performed by the operator can be simplified so that the operability for the operator can be enhanced. Consequently, working efficiency can be enhanced.

According to the tenth and eleventh aspects of the invention, the teaching box and the robot controller communicate with each other. Thus, a working sequence to be performed by a robot can be set. Also, the state of each robot can easily be monitored.

According to the above, the text size and the coloration can be customized by an operator. The operability can be enhanced. Working efficiency can be enhanced. Safe operations of each robot can be achieved.

BRIEF DESCRIPTION OF THE DRAWINGS

FIG. 5 is a flowchart showing an operation sequence of changing a text to be displayed on the teaching box.

FIG. 6A is a diagram showing texts before customization, while

FIG. 8A is a diagram showing a size of buttons before being customized, while FIG. 8B is a diagram showing a customized size of the buttons.

FIG. 9 is a flowchart showing an operation of returning the customized size of the operation button size to a standard size.

Figure 1:
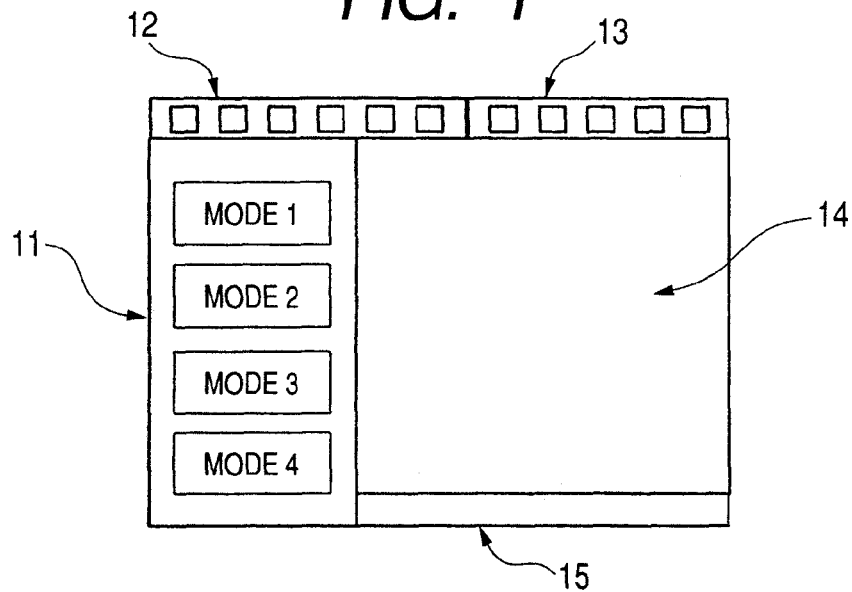
FIG. 1 is a diagram showing an example of a screen displayed in a display area of a teaching box according to an embodiment of the invention.

DESCRIPTION OF REFERENCE NUMERALS 11 main menu area
12 pulldown menu area
13 status area
14 general-purpose area
15 message area
21 area selection portion
22 color selection portion
23 size selection portion
24 determination button
25 cancel button
26 teaching box
27 robot controller
28 robot
29 communication interface
30 central processing unit
31 read-only memory
32 read/write memory
33 touch panel interface
34 graphic controller
35 RAM
36 multifunctional panel
37 touch panel
38 liquid crystal display device
39 communication interface
41 button customization
42 operation button size customization screen
44 change area selection portion
45 size selection portion
46 OK button 47 text size automatic customization
51 main menu
52 teaching box
521 shift key
522 upper arrow key
523 lower arrow key
61 main menu
62, 63 touch operation buttons
64 general purpose area
71 standard button size

BEST MODE FOR CARRYING OUT THE INVENTION

Hereinafter, embodiments of the invention will be described with reference to the drawings.

Embodiment 1

FIG. 1 is a diagram showing an example of a screen displayed in a display area in a teaching box of an industrial robot according to an embodiment of the invention. In FIG. 1, reference numeral 11 denotes a main menu area for selecting a screen to be displayed in a general-purpose area, reference numeral 12 denotes a pulldown menu area for performing an operation concerning the screen displayed in the general-purpose area, reference numeral 13 denotes a status area for indicating an operational status, reference numeral 14 denotes the general-purpose area for displaying various data, and reference numeral 15 denotes a message area for displaying errors and information. An operation mode is selected in the main menu area 11 in which operation modes, such as a job mode, a variable setting mode, a controller setting mode, and a screen setting mode, are arranged. An operating condition is set in the pulldown menu area 12. In the status area 13, a current operation condition of a robot is displayed. In the general-purpose area 14, a detailed operational status of a robot is displayed. In the message area 15, error information necessary for an operator is displayed.

The present invention differs from Patent Document 1 in that a screen setting mode is provided in a teaching box for use in a robot, thereby providing a function of changing a color and a size of a text in each area.

Figure 2:
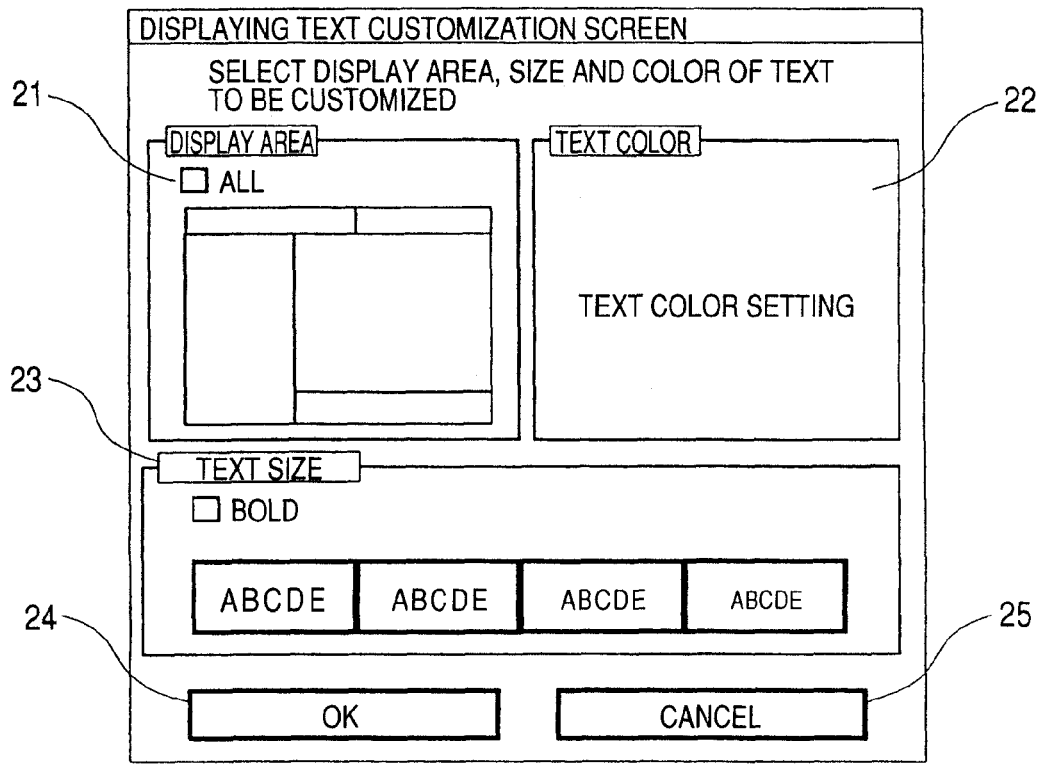
FIG. 2 is a diagram showing a displaying text customization screen according to an embodiment of the invention.

Next, a case in which a screen setting mode is selected from the main menu area 11 will be described with reference to FIG. 2. FIG. 2 shows a displaying text customization screen which is opened when the screen setting mode is selected. In FIG. 2, reference numeral 21 denotes an area selection portion for selecting an area to be customized, reference numeral 22 denotes a color setting portion for setting a color of the displaying text to be customized reference numeral 23 denotes a size selection portion for setting a size of the displaying text to be customized, reference numeral 24 denotes a determination button, and reference numeral 25 denotes a cancel button for canceling the setting. In the area selection portion 21, an area in which a size and a color of a text are desired to be changed is selected. An operator can set the size and the coloration of the text in accordance with an operating status from the displaying text color selection portion 22 and the displaying text size selection portion 23.

Figure 3:
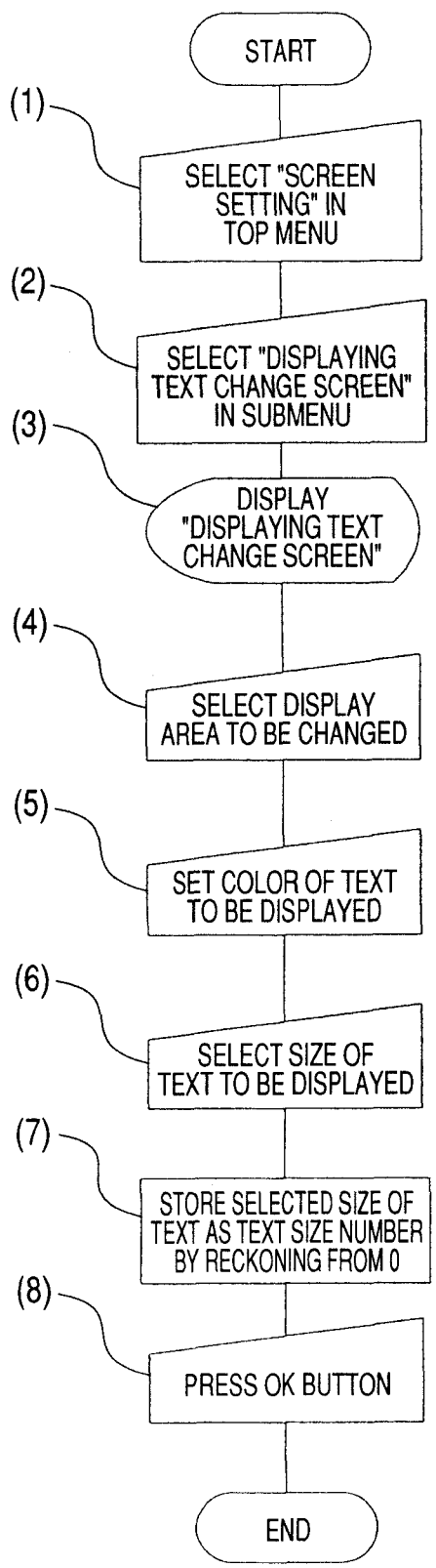
FIG. 3 is a flowchart showing an operation sequence of a displaying text customization.

Next, an operation sequence in a case where the screen setting mode is selected from the main menu area 11 will be described with reference to FIGS. 3, 4A and 4B by taking a change of a text in the general-purpose area 14 as an example.

First, the display area selection portion 21 is selected. Then, the general-purpose area which is an area to be customized is selected (1).

Subsequently, a color of a displaying text to be customized is set from the color setting portion 22 (2).

Figure 4A:
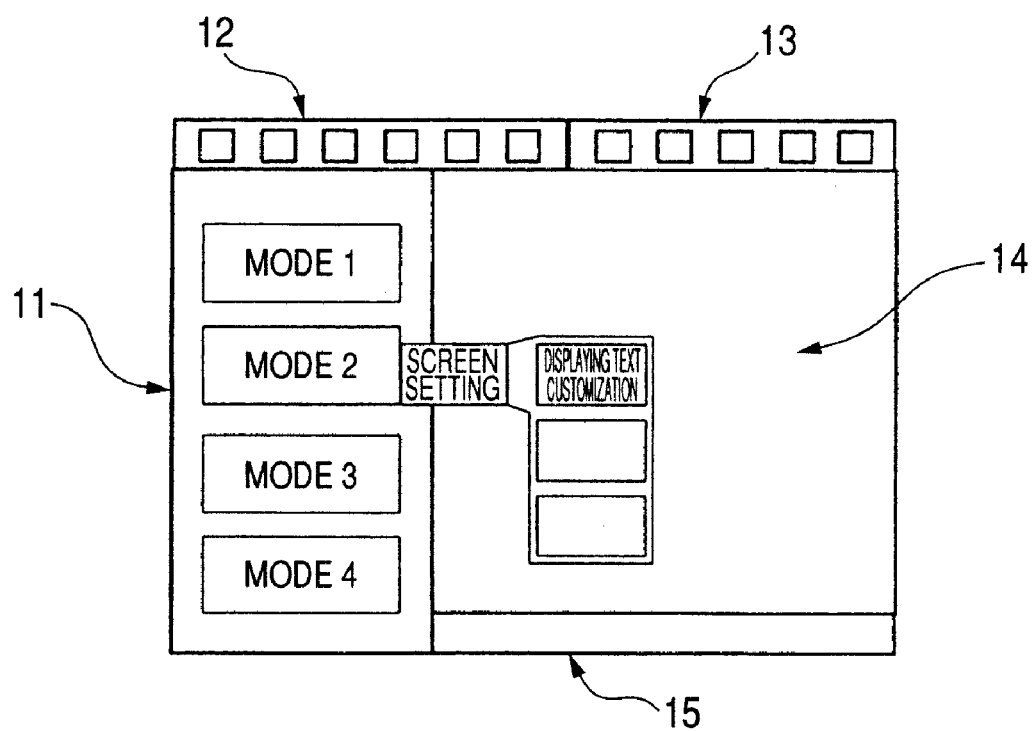
FIG. 4A and FIG. 4B are diagrams, each showing a display of the teaching box during the operation sequence.
Figure 4B:
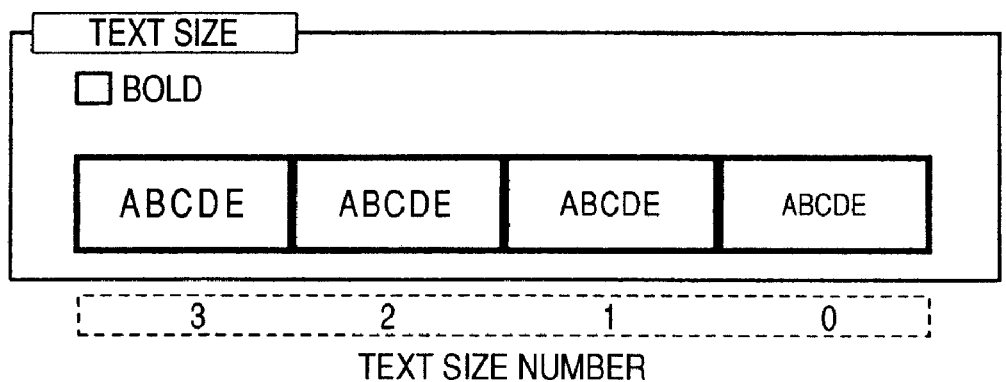

As shown in FIG. 4A, the screen setting mode is selected from the main menu area 11 of the screen of the teaching box (1), and displaying text customization is set from the screen setting mode (2).

When the displaying text customization is selected, a displaying text customization screen is displayed (3), and an operation area to be changed is selected from the display area shown in FIG. 2. More specifically, the display area selection portion 21 is selected, and the general-purpose area 14 which is an area to be customized is selected (4).

Next, a color of a displaying text to be customized is set from the color setting portion 22 (5).

Subsequently, the size of the displaying text to be customized is selected from the size selection portion 23 (6). As shown in FIG. 4B, the selected size is stored as a text size number together with information on whether a check box for boldface is marked or not (7).

When an OK button for determining the setting is pressed after the setting of the text (8), the displaying text customization screen is closed. Then, processing for text customization is started.

Next, a display sequence for displaying a customized text will be described with reference to FIG. 5 by taking change of a text in the general-purpose area 14 as an example.

First, a width and a height H of the general-purpose area 14 are obtained in units of pixels (1).

Subsequently, a minimum number of lines (Lmin) set for the general-purpose area 14 for an optimum display is obtained (2).

Next, the maximum number of lines ($L_{max}$) set for the selected display area for an optimum display is obtained (3).

Subsequently, the number of lines to be displayed is calculated from a formula given below in accordance with the selected text size (4). N is a number of selectable sizes of the text.

Number of lines to be displayed=$L_{min}+(L_{max}-L_{min})/(N-1)\times$Text size number Next, a height of a text is calculated in units of pixels in accordance with a relationship of the height of the display area H/the number of lines to be displayed (5).

Subsequently, a font having a height that is closest to the height of the text obtained in (5) is selected from a list of heights of preliminarily stored fonts which are represented in units of pixels, and the selected front is set as a current font in the display area (6).

Next, the general-purpose area is redrawn with the font that is set (7).

Figure 6A:
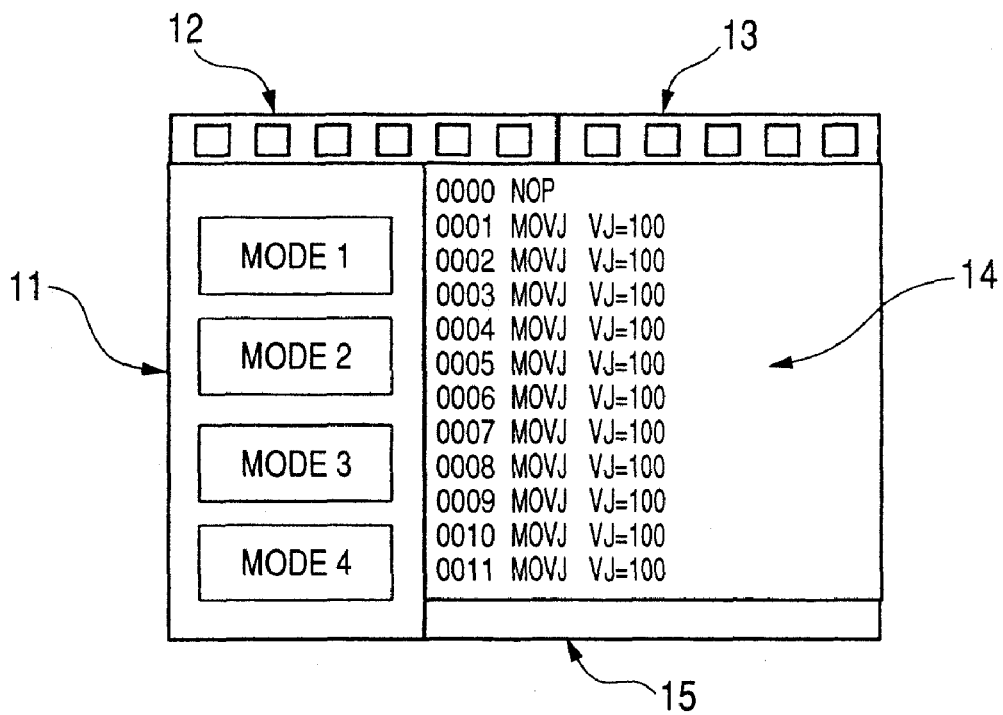

FIG. 6A shows a result of changing a text in the general-purpose area as described above. FIG. 6A shows a screen before the customization of the displaying text in the general-purpose area, while FIG. 6B shows a screen after the customization.

Figure 6B:
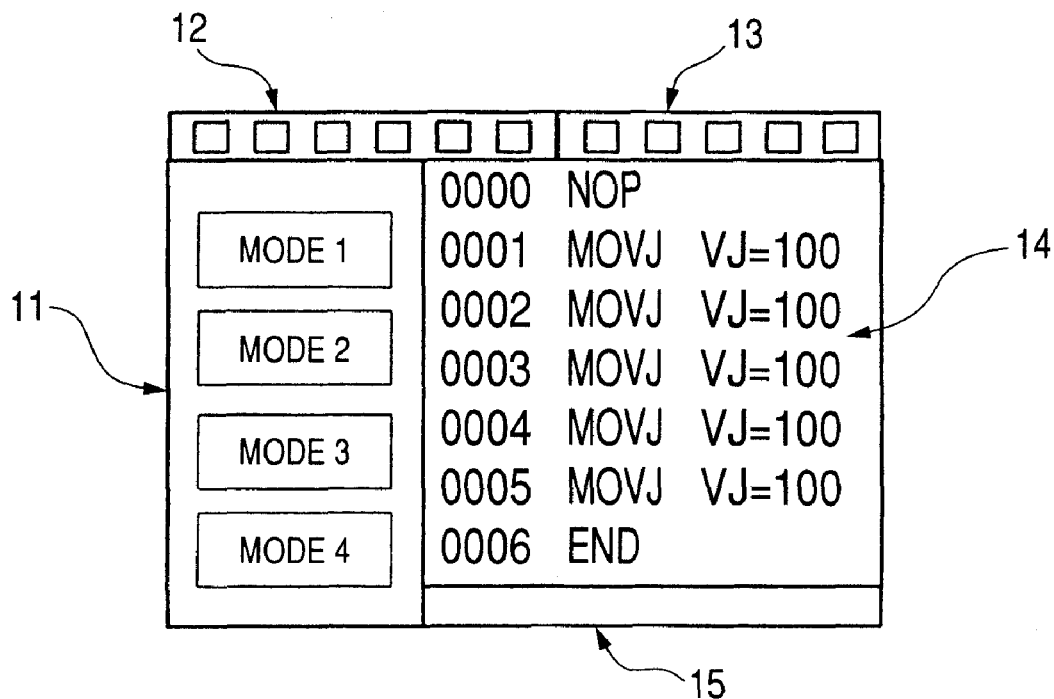
FIG. 6B is a diagram showing the texts which are customized.

According to the above-described operation and a program being worked, the size and the color of a text change between before and after the customization of the general-purpose area as shown in FIG. 6A and FIG. 6B. Thus, an operator can customize a text to be displayed so as to enhance usability.

Embodiment 2

Figure 7:
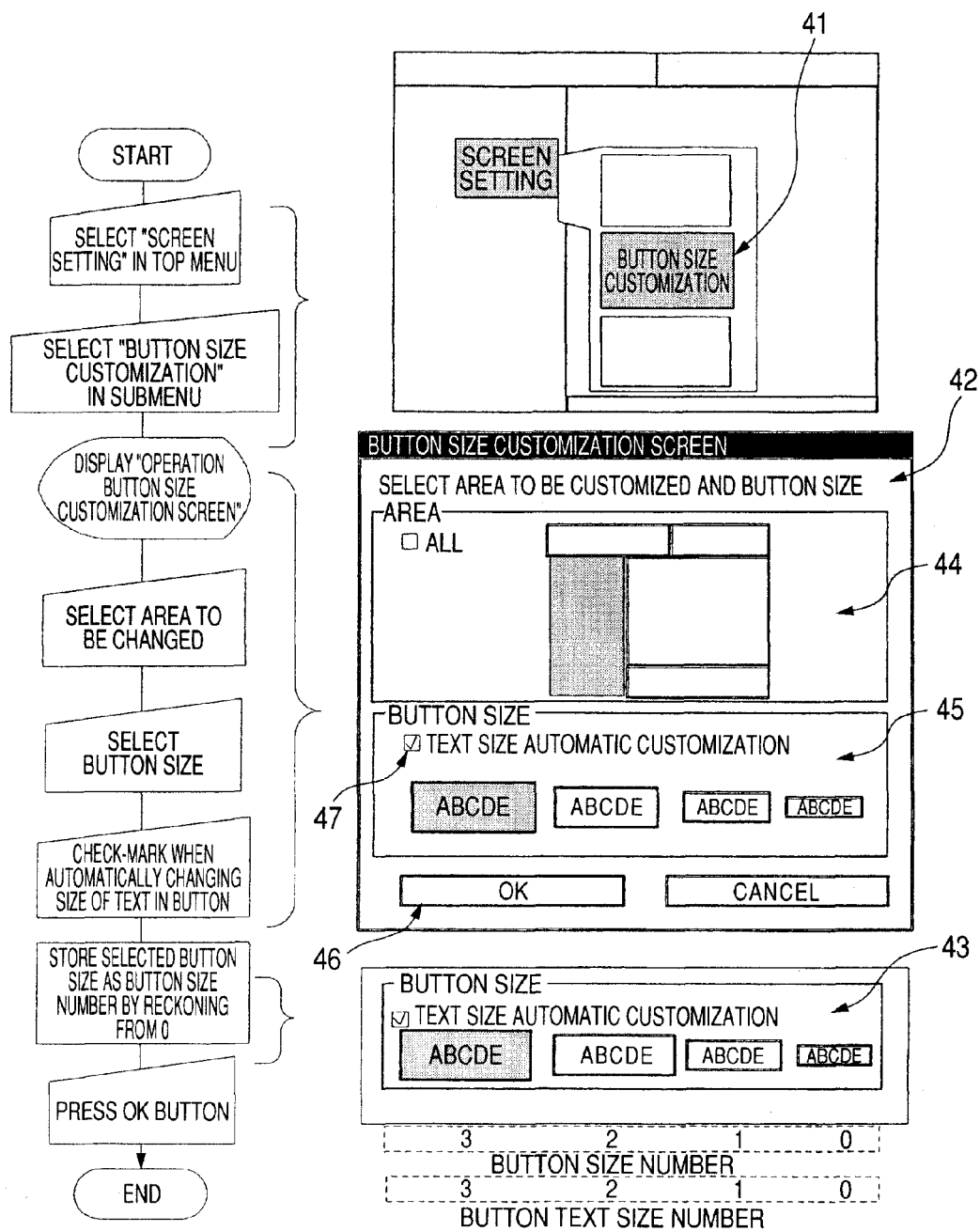
FIG. 7 is a flowchart showing a customization of a size of an operation button.

FIG. 7 is a flowchart showing a customization of an operation button size.

An operation of customizing a button size on an operation button size customization screen will be described by taking a case in which a customization of a size of buttons in the main menu is performed as an example.

(1) "Button size customization" 41 is selected from the "screen setting" in the main menu. This operation causes the operation button size customization screen 42 to be displayed on a screen.

(2) A changing area selection portion 44 is selected, and the main menu, which is an area to be customized, is selected. A black shaded part indicates the area that is selected.

(3) A size of a button to be customized is selected from a size selection portion 45, and at the same time, the selected size is stored as a button size number in a program. When changing a text to be displayed on a button to have a text size corresponding to the size of the button, a text size automatic customization 47 is check-marked.

(4) When the OK button 46 for determination of the setting is pressed after the setting of the size of the button, a process of button size customization is started.

Next, processing in a program concerning a customization of the operation button will be described.

(1) A height of the main menu is obtained in units of pixels.

(2) The number of buttons, which can be displayed in one column, is calculated from the height of the main menu and the selected button size. At the same time, intervals between the adjacent buttons is calculated so to be constant. In a case where the buttons to be displayed cannot be displayed in one column, the buttons are displayed in a plurality of columns.

(3) The buttons of the main menu are recreated and rearranged with the selected button size. The number N1 of buttons, which can be arranged in one column in the main menu area, is calculated in accordance with a vertical length of the main menu area and a vertical length of the selected button size. When the number of buttons to be displayed in the main menu area is N, and in a case where N<N1, first to N-th buttons are arranged in one column in a case where N>$N_1$, an ($N_1$+1)-th button is disposed at the top of a second column, and ($N_1$+1)-th to the 2N-th buttons are arranged in the second column. Similarly, subsequent buttons are disposed in the main menu area. A lateral width of the main menu area becomes (N/$N_1$×a lateral width of the button size). At that time, in a case where the text size automatic customization 47 is check-marked in the previously described operation (3), the size of a text to be displayed on a button is changed to a text size corresponding to the button size, and the text is redrawn. In a case where the text size automatic customization 47 is not check-marked, the text is displayed with a standard text size.

(4) Due to the change in the size of the main menu, it is necessary to change the size of the general-purpose area. Thus, the general-purpose area is rearranged according to the size of the main menu. The lateral width of the general-purpose area becomes (the lateral width of the entire screen—a lateral width of the main menu area).

According to the above-described operation and the internal processing by the program, the size of a button size is changed between before and after the customization of the button size as shown in FIG. 8A and FIG. 8B. Thus, an operator can customize the button to have more suitable size in each area.

Next, an operation of restoring the customized button in the main menu and the pulldown menu to the standard size will be described with reference to FIG. 9.

(1) "Standard button size" 71 in "screen setting" in the main menu is selected.

(2) The size of the buttons in the main menu and the size of a text in the main menu are recreated and rearranged with standard sizes, respectively.

(3) The size of the buttons in the pulldown menu and the size of a text in the pulldown menu are recreated and rearranged at standard sizes, respectively.

(4) Because the sizes of the main menu and the pulldown menu are changed to the standard sizes, respectively, the size of the general-purpose area is also recreated and rearranged with the standard size.

The customization of the sizes of buttons in the main menu and the pulldown menu can be arranged at the standard positions and sizes respectively by selecting a standard button size 71.

Embodiment 3

Figure 10:
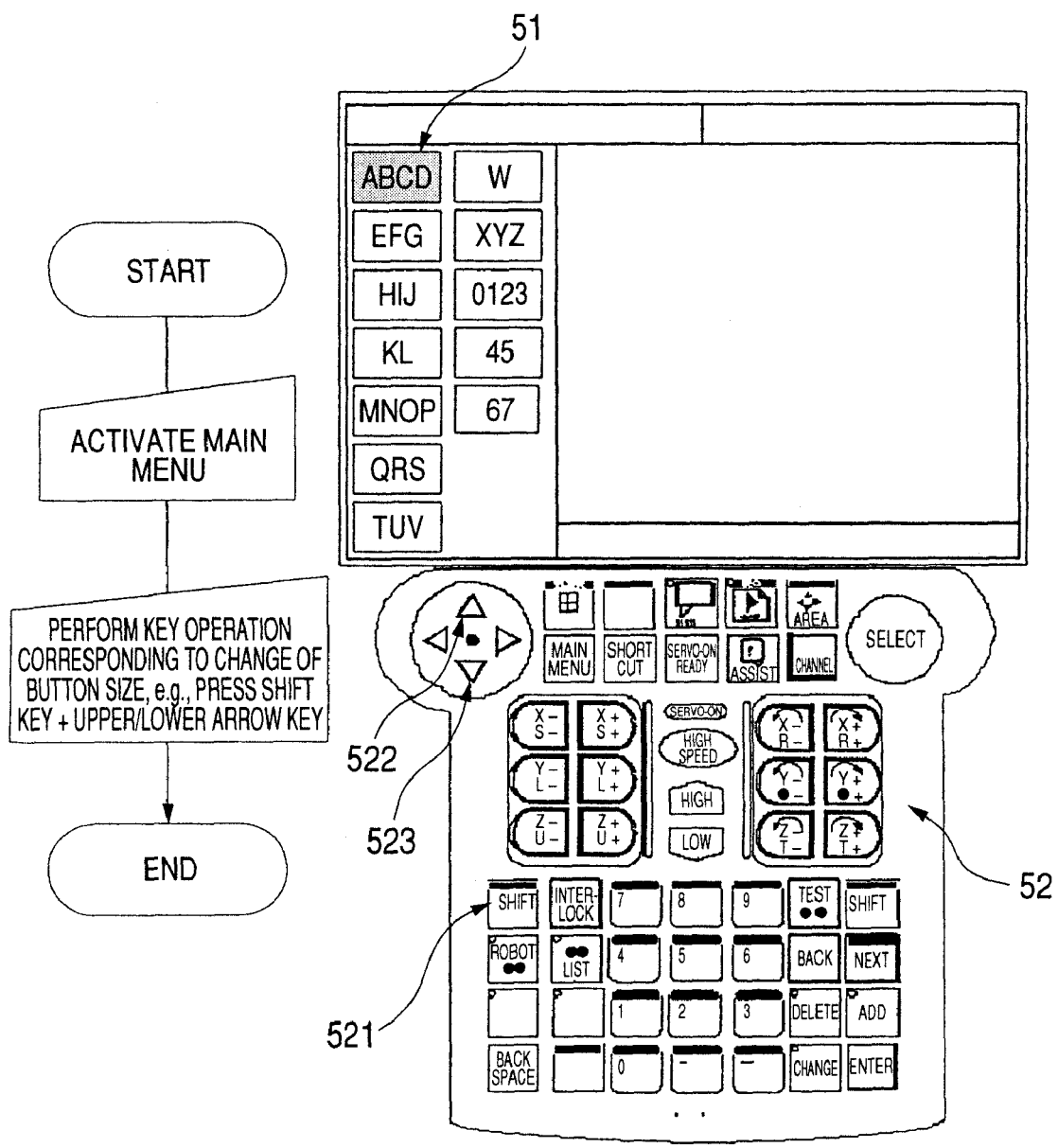
FIG. 10 is a flowchart showing a customization performed by operating keys of the teaching box.

A case of performing customization of a button size in the main menu by operating only an operation key of the teaching box 51 will be described with reference to FIG. 10.

For example, an operation of the key of the teaching box 52 for customization is set as follows. When increasing the button size by one step, a shift key 521 and an upper arrow key 522 are simultaneously pressed. When reducing the button size is by one step, the shift key 521 and a lower arrow key 522 are simultaneously pressed.

Next, operations will be described.

(1) The main menu 51, which is an area in which the button size is to be customized, is put into a selected state.

(2) When increasing the button size by one step, a shift key 521 and an upper arrow key 522 are simultaneously pressed. In order to further increase the button size, the shift key 521 and the upper arrow key 522 are continuously pressed.

(3) When reducing the button size by one step, the shift key 521 and a lower arrow key 523 are simultaneously pressed. In order to further decrease the button size, the shift key 521 and the lower arrow key 523 are continuously pressed.

(4) The button in the main menu is recreated and rearranged with a selected button size.

(5) The change in the size of the main menu causes the size of the general-purpose area to be redetermined according to the size of the main menu.

An internal processing by a program, and results of a display before and after the customization, are similar to those described in the description of Embodiment 2. Thus, the description thereof will be is omitted.

Embodiment 4

Figure 11:
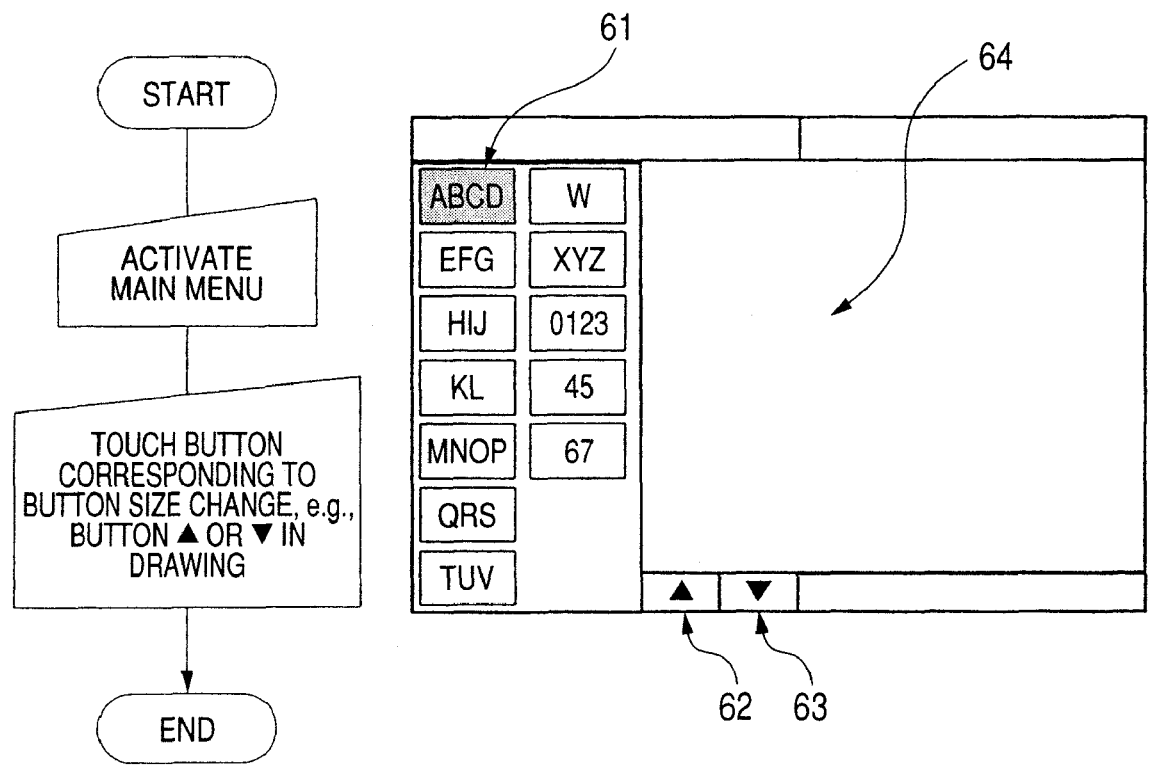
FIG. 11 is a flowchart showing a customization performed by a touching operation to a touch panel.

A case of performing customization of a button size in the main menu by performing only a touch operation on a touch panel in the screen will be described with reference to FIG. 11.

Description will be given for a casein which touch operation buttons 62, 63 for the customization are provided in the main menu 11. An arrangement of the touch operation buttons 62, 63 is not limited to the arrangement shown in FIG. 5, and may be arranged at any positions as long as they can be operated on the screen.

Next, operations will be described.

(1) The main menu 61, which is an area in which the button size is to be customized, is brought into a selected state.

(2) When increasing the button size by one step, the touch operation button 62 is pressed. In order to further increase the button size, the touch operation button 62 is continuously pressed.

(3) When reducing the button size one step, the touch operation button 63 is pressed. In order to further decrease the button size, the touch operation button 63 is continuously pressed.

(4) The button in the main menu 61 is recreated and rearranged at a selected button size.

(5) The change in the size of the main menu 61 causes the size of the general-purpose area 64 to be redetermined according to the size of the main menu 61.

An internal processing by a program, and results of a display before and after the customization, are similar to those described in the description of Embodiment 2. Thus, the description thereof will be is omitted.

Embodiment 5

Figure 12:
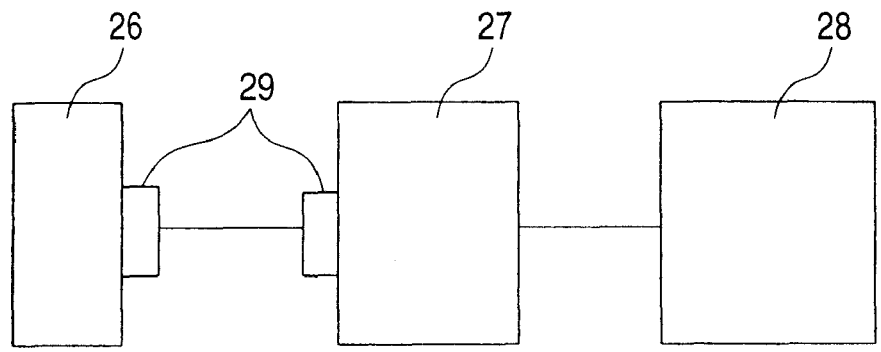
FIG. 12 is a diagram showing a robot system according to an embodiment of the invention.
Figure 13:
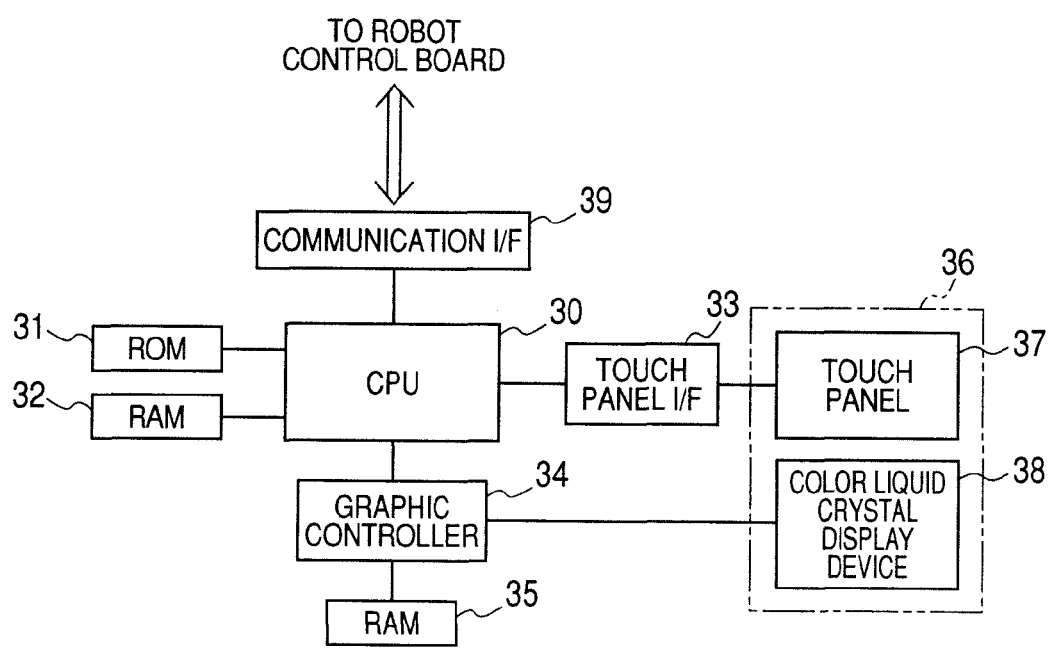
FIG. 13 is a diagram showing a conventional teaching box.

FIG. 12 is a diagram showing the schematic configuration of a robot system. Reference numeral 26 denotes a teaching box, reference numeral 27 denotes a robot controller, reference numeral 28 denotes a robot, and reference numeral 29 denotes a communication interface. The robot 28 to be used is described below by taking an industrial robot having multi-joints as an example. The robot controller 27 monitors an operational status, and executes a working sequence according to work operations such as conveying, welding, or coating. In this working sequence, an operator uses the teaching box 26 so as to upload working parameters, such as a working speed and a working amount, appropriate for working conditions of the robot 28 to the robot controller 27 through the communication interface 29, and to receive the operation status from the robot 28, which is detected by the robot controller 27, through the communication interface 29.

Thus, the teaching box 26 and the robot controller 27 communicate with each other, so that the working sequence of the robot can be set and the status of the robot can easily be monitored.

INDUSTRIAL APPLICABILITY

A teaching box according to the invention, can be applied not only to a robot but also to a working machine which requires an operation function or a humanoid robot as long as an operator performs a monitoring of an operation condition and operation settings while via an operation screen.

The invention claimed is:

1. A teaching box for monitoring and operating an industrial robot, which is operable in a plurality of working modes including a teaching mode and an operation setting mode, the teaching box comprising:
a display panel;
a main menu area displayed on the display panel so as to present a plurality of operation modes; and
a general-purpose area displayed on the display panel so as to present a working status of the industrial robot,
wherein:
one of the plurality of operation modes displayed on the display panel is a screen setting mode,
the teaching box is configured to display a plurality of sub-menus upon selection of the screen setting mode, the plurality of sub-menus including a text customization sub-menu,
the teaching box is operable to communicate with a robot controller of the industrial robot to set a working condition and to monitor an operating state of the industrial robot, and
in response to a selection of the text customization sub-menu, the teaching box is configured to display:
an area selection portion configured to select one of the main menu area and the general-purpose area for text customization,
a color selection portion configured to set a color of text in the selected one of the main menu area and the general-purpose area, and
a size selection portion configured to set a size of the text in the selected one of the main menu area and the general-purpose area.

2. The teaching box of claim 1, wherein the plurality of sub-menus further include a button size customization sub-menu for customizing a size of operation buttons displayed in the main menu area that correspond to each of the operation modes.

3. The teaching box according to claim 2, wherein:
the size of the operation button in the main menu area is changed from an operation key of the teaching box.

4. The teaching box according to claim 2, wherein:
the size of the operation button in the main menu area is changed from a touch panel on a screen.

5. The teaching box according to claim 2, wherein the plurality of sub-menus further include a standard button size sub-menu and the teaching box is configured to restore a size of a text, a coloration, and a size of a button in the main menu area and the general purpose area to a default size and coloration upon selection of the button size sub-menu.

* * * * *